United States Patent Office 3,754,047
Patented Aug. 21, 1973

3,754,047
LOW VOLATILE COMPLEXING SOLUTIONS FOR OLEFIN RECOVERY
Robert B. Long, Atlantic Highlands, Hugh H. Horowitz, Elizabeth, and David W. Savage, Summit, N.J., assignors to Esso Research and Engineering Company
No Drawing. Filed June 2, 1972, Ser. No. 259,077
Int. Cl. C07c 7/00
U.S. Cl. 260—677 R                           7 Claims

ABSTRACT OF THE DISCLOSURE

A process for separating complexible ligands is disclosed wherein a feedstream containing complexible ligands is contacted with a cuprous salt-sorbent material dissolved in a complexing solvent; the complexing solvent contains a major amount of a multi-ringed, high boiling, low melting aromatic and a minor amount of a strongly complexing, high boiling, single ringed aromatic. Separation of the ligands is effected by their complexation with the cuprous salt-sorbent material which removes said ligands from the feedstream to be subsequently recovered by decomplexing or ligand exchange techniques.

FIELD OF THE INVENTION

This invention relates to the separation and recovery of complexible ligands from ligand-containing feedstreams. More particularly, the invention relates to an improved method for the separation of complexible ligands contained in a feedstream by contacting said feedstream with a cuprous salt-sorbent material, dissolved in a complexing solvent, capable of forming a complex with such ligand. In a preferred embodiment, the invention relates to the use of high boiling aromatic hydrocarbon solvents for complexing solutions. These aromatic hydrocarbon solvents comprise a major amount of multi-ringed, high boiling, low melting aromatics and their mixtures; by major amount is meant more than about 50 mole percent based on the total number of moles of solvent. The complexing solutions additionally will contain a minor amount of a high boiling, strongly complexing, single-ringed aromatic such as alkyl substituted benzenes; by minor amount is meant less than about 50 mole percent based on the total number of moles of solvent.

DESCRIPTION OF THE PRIOR ART

U.S. Pat. No. 3,410,924 describes a process for recovering complexible ligands from feedstreams by contacting them with a cuprous halide salt contained in an anhydrous slurry in the presence of a $C_5$ monoolefin sorbent activator.

Another process described in U.S. Pat. No. 3,218,366 describes the separation of olefins from hydrocarbon mixtures via a selective absorption method with silver fluoroborate or silver fluorosilicate. The separation of nonaromatic unsaturated hydrocarbons from more saturated hydrocarbons by selective complex formation with cuprous trifluoroacetate dissolved in a solvent such as propionitrile and the like has been disclosed in U.S. Pat. No. 3,401,112. Beckham et al. in U.S. Pat. No. 3,517,081 teaches a process for the separation of unsaturated hydrocarbons from an admixture with saturated hydrocarbons by contacting the feed with cuprous fluoroborate or cuprous fluorophosphate dissolved in aromatic hydrocarbon solvents such as toluene, ethyl benzene, ethyl toluene, xylenes and tetrahydronaphthalene.

Finally, in Ser. No. 805,912 now U.S. Pat. No. 3,651,159 and U.S. Pat. No. 3,592,865, there is described the preparation and use of bimetallic salts, i.e., cuprous tetrachloroaluminate as dissolved in aromatic hydrocarbons, i.e., benzene as useful for the separation and recovery of complexible ligands by ligand exchange process. A drawback of the processes which are described in these references is related to the high volatility of the benzene solvent causing the benzene to flash off when a complex ligand such as ethylene is being decomplexed in the decomplexer; this factor necessitates a costly additional process step of separating the benzene vapors from the ethylene. Accordingly, an improvement in the operation of these prior art processes is desirable.

SUMMARY OF THE INVENTION

In accordance with the present invention an improved process is provided for separating complexible ligands from feedstreams by contacting the feedstreams with cuprous salt-sorbent materials such as cuprous tetrachloroaluminate ($CuAlCl_4$). The improved process provides for the cuprous complexing agent to be dissolved in a solvent comprised of a major amount of multi-ringed, high boiling, low melting aromatics and a minor amount of strongly complexing, high boiling, single-ringed aromatics. The separation is effected by the ligand complexing with the sorbent material to thereby remove said ligand from the feedstream. More particularly, the invention describes the use of specific high boiling aromatic solvent compositions boiling in the range of about 150° to about 450° C., which will result in an improved light olefin recovery process in which cuprous complexing salts such as cuprous tetrachloroaluminate are employed to complex with ligands such as ethylene.

It has been unexpectedly discovered that when a light olefin recovery process takes place in the presence of complexing solvents comprised of a major amount of multi-ringed, high boiling, low melting, aromatics such as biphenyl, substituted biphenyls, naphthalene, and alkyl-substituted naphthalenes, and a minor amount of strongly complexing, high boiling, single-ringed aromatics, the process is provided with efficient complexing solutions and is quite attractive, economically. In accordance with the present invention it has been further found that the use of said multi-ringed, high boiling, low melting aromatics as solvents by themselves, results in an increase in the overall viscosity of the complexing solution. This increase in viscosity adds to process operation parameters and in fact tends to lower the overall efficiency of the process. Hence, in addition to employing a major amount of said multi-ringed, high boiling, low melting aromatics in the solvent, it is essential that included in the complexing solvent, is a minor amount of strongly complexing, high boiling, single-ringed aromatics.

It is further believed that the high viscosities of the multi-ringed aromatic complexes are effectively lowered by the addition of minor amounts of strongly complexing, high boiling, single-ringed, aromatics due to an interruption in the development of chains or alternatively the interruption of the highly ordered zones which may form within the solution. There is, however, no intention to be bound by specific theory.

Moreover, the replacement of the benzene solvent material by a multi-ringed aromatic such as biphenyl does not result in any sacrifice in the capacity of the complexing solution. This is because for every two benzene molecules replaced by one biphenyl molecule the same amount of cuprous (I) salt is able to be complexed; each ring of the biphenyl compound is able to complex a cuprous (I) salt ion. At the same time, the volatility of the complexing solution decreases markedly, thereby facilitating the recovery of the complexible ligand in a decomplexing stage. The addition of a minor amount of high boiling, strongly complexing, single-ringed aromatics to terminate chains and effectively lower the solution viscosity results in an overall improvement in the process; said improvement arising from the combination of both of the above-described solvent components being employed in the complexing solutions.

The process is suitable for separating a wide variety of complexible ligands such as olefins, acetylenes, aromatics, carbon monoxide and the like. More specifically, the unsaturated hydrocarbons can be acetylene such as $C_2$–$C_6$ acetylenes, preferably $C_2$–$C_4$ acetylenes, for example, acetylene, methylacetylene, ethylacetylene, dimethylacetylene, vinylacetylene, etc.; monoolefins such as $C_2$–$C_{20}$ monoolefins, preferably $C_2$–$C_{10}$, more preferably $C_2$–$C_5$ monoolefins, most particularly ethylene and propylene; conjugated diolefins such as $C_4$–$C_{10}$ conjugated diolefins, preferably $C_3$–$C_6$, for example, butadiene, isoprene, etc.; polyolefins such as $C_6$–$C_{16}$, preferably $C_6$–$C_{12}$ polyolefins, for example, cyclododecatriene, cyclooctadiene; cyclic olefins and alicyclic olefins such as $C_5$–$C_{10}$, preferably $C_6$–$C_8$, for example, cyclopentene, cyclohexene, cyclooctene, etc.; aromatics such as $C_6$–$C_{12}$ aromatics, preferably $C_6$–$C_8$ aromatics, for example, benzenes, xylenes, toluenes; and cumulative diolefins such as $C_3$–$C_6$ cumulative diolefins, for example, allene. Preferably the process is applicable to the separation of complexible ligands such as $C_2$–$C_4$ monoolefins, $C_2$–$C_4$ acetylenes, carbon monoxide and $C_6$–$C_9$ aromatics.

Generally the complexible ligands to be separated by the process are contained in a feedstream in admixture with other components which are not as preferentially complexed. For example, such feedstreams as ethane-ethylene or propene-propylene can be treated to concentrate the olefin. The complexing agent or sorbent material may be a cuprous salt of weakly basic acids such as tetrachloroaluminate ($AlCl_4^-$), tetrafluoroborate ($BF_4^-$) and trifluoroacetate ($CF_3COO^-$) as well as cuprous salts having the following formulas: $CuPF_6$, $CuBCl_4$, $CuAlBr_4$, $CuAlCl_xBr_y$ and $Cu\phi_xAlCl_y$ (where $x+y=4$ and $\phi$ is phenyl); preferably, the sorbent employed is cuprous tetrachloroaluminate ($CuAlCl_4$).

As has been previously described above, the sorbent solvent comprises a major amount of multi-ringed, e.g., at least two rings, high boiling, low melting aromatics. The aromatics amenable to the practice of the instant invention and referred to as being high boiling, have a boiling point in the range of from about 150 to 450° C., preferably from 200 to 400° C. and most preferably from about 250 to 300° C. By low melting is meant that the melting points for these aromatics will range from —100° C. to 125° C., more preferably from —50° C. to +50° C., most preferably from about less than —10° C. to about +40° C.

Examples of multi-ringed aromatics useful in the practice of the instant invention include biphenyl, substituted biphenyls, and by the expression substituted biphenyls is meant biphenyls substituted with groups such as chloro, bromo, alkyl and the like. For example, diphenyl methane, 1,1-diphenyl ethane, 1,2-diphenyl ethane, 2-methyl biphenyl, 3-methyl biphenyl, 4-methyl biphenyl, 2,2'-dimethyl biphenyl, 2,3'-dimethyl biphenyl, 3,3'-dimethyl biphenyl, 4,4'-dimethyl biphenyl, 2-isopropyl biphenyl, mixed isopropyl biphenyls; O-chloro biphenyl, cyclohexylbenzene, cumene and the like.

The term multi-ringed aromatic is meant to include polynuclear moieties such as polyphenyl alkanes, substituted polyphenyl alkanes, naphthalene, alkyl substituted naphthalenes such as methyl naphthalene, 1-methyl 9,10-dihydroantracene, 2-methyl 9,10-dihydroanthracene, and the like. The major amount of the sorbent solvent may also contain mixtures of the multi-ringed aromatics set forth above.

The sorbent solvent material must also include a minor amount of high boiling, strongly complexing, single-ringed aromatics, such as alkyl substituted benzenes and heterosubstituted benzenes wherein the alkyl substituents have carbon atoms in the range of from about 2 to 30, more preferably from 2 to 20, and most preferably from 3 to 9 carbon atoms. By heterosubstituted benzenes is meant benzene rings with groups such as chloro, bromo, attached to the ring or to a carbon of the ring. Representative examples of the single-ringed aromatics that are useful include triisopropylbenzene, trimethyl benzene, tetramethyl benzene, cumene, tetraethyl benzene, butyl benzene, cyclohexyl benzene, tetralin, chlorotoluenes, chloroxylenes and the like.

The capacity of the complexing sorbent is defined as the moles of ethylene absorbed per mole of copper and said capacity should be in the range of from 0 to about 2, more preferably 1.5 to 2 at room temperature and atmospheric pressure. The loading capacity of the sorbent into the complexing solution should be in the range of from 0 to 20 wt. percent of Cu(I), preferably from about 10 to 15 wt. percent. The viscosity of the complexing solution should be in the range of from 0.5 to 12 centistokes at 50° C., more preferably from 3 to 9 centistokes and most preferably less than about 5 centistokes at 50° C.

The process may be operated at a wide variety of temperature and pressure conditions. For any complexing, reaction temperatures may range from about —40° F., to about 300° F., preferably —40° F. to 200° F., more preferably about 50° F. to 100° F. Pressure similarly may vary widely and can range from about 0.5 atmosphere to about 100 atmospheres, preferably from 1 to 20 atmospheres.

Recovery of the desired ligand may be carried out in two ways: displacement or decomplexing by heating, a technique adequately described in copending Ser. No. 259,078, herein incorporated by reference; the latter will occur at temperatures higher than complexing for constant pressure processes and in the range of about 50° F. to about 500° F., preferably about 200° F. to 400° F., or at lower pressures than for complexing for constant temperature processes and in the range of about 0.1 to 30 atmospheres, preferably 0.5 to 20 atmospheres. Decomplexation may also be carried out in multiple staged flashing, i.e., heating in stages, a technique adequately described in copending application Ser. No. 259,078 herein incorporated by reference. The preparation of the cuprous complexing materials is adequately described in U.S. Ser. No. 805,912 and is also incorporated by reference now U.S. Pat. No. 3,651,159.

DESCRIPTION OF THE PREFERRED EMBODIMENTS

In a preferred embodiment of the invention described herein ethylene and propylene may be separately recovered from a feedstream; said feedstream being obtained from the light ends section of a conventional steam cracking unit. Such a feedstream, from which acetylene and carbon monoxide may be previously removed by cuprous ammonium acetate complexing and conventional carbon monoxide absorption contains methane, ethane and propane and hydrogen in addition to the desired ethylene and propylene ligands. These desired ligands can be recovered in purities exceeding 95%, preferably exceeding 99% by the process of this invention wherein the complexing solutions employ in a major amount multi-ringed, high boiling, low melting aromatics, together with a minor amount of high boiling, strongly complexing, single-ringed aromatics.

In a typical process scheme for ethylene recovery from steam cracking or other operations, the feed to the complexer is gaseous $C_2$ and lighter material. This steam may be produced in a conventional absorber deethanizer, or cryogenic deethanizer section. The $C_2^-$ feed typically contains a low concentration of $C_3$'s to meet a less than 50 p.p.m. specification on $C_3^+$ in the ethylene product. Sulfurous impurities and acid gases are usually removed upstream of the deethanizer.

The $C_2^-$ stream from the deethanizer, after acetylenes conversion and drying, enters the base of the ethylene complexer tower. This may be a conventional plate column in which complex comprising an aromatic solution of cuprous salt sorbent material lean in ethylene (having typically about 0.5 mol of ethylene per mol of copper) is fed to the top tray and flows downward countercurrently to the feed gas stream. Intercoolers are provided along the column to remove from the complexing solution the heat of complexation of ethylene. Typically, the temperature profile in the complexer would be about 120° F. at the top, 120°–150° F. at the feed plate, with a maximum intermediate temperature of 170° to 190° F. Total pressure in the complexer is typically 5–20 atmospheres. The noncomplexed gases, e.g., hydrogen, methane, ethane, pass overhead usually into a fuel system. A section of tower below the feed plate is provided to strip out dissolved saturated hydrocarbons, such as ethane and undesirable complexed species, such as carbon monoxide and acetylenes. The stripping gas for this section is provided by recycling high purity olefin gas from the intermediate decomplexer flash to the base of the complexer stripper tower.

Example 1

A 100 ml. glass reaction vessel with gas inlet and outlets and containing a thermometer and mechanical stirrer was used to measure ethylene complexing and decomplexing at atmospheric pressure with various aromatic complexes of $CuAlCl_4$. The vessel was immersed in an oil bath that held complex temperature to $\pm 1°$ C. The amount of gas taken up or given off in any temperature interval was determined from readings of wet test meters in the inlet and outlet lines. Gas composition was checked with a gas chromatograph. This set up allowed measurement of complex loading with ethylene (mols ethylene/mol of copper) at various temperatures. All complexes were prepared as described in U.S. Ser. No. 805,912. In an initial test, $CuAlCl_4$ complexes in three different solvents—benzene, diphenyl methane and cyclohexyl benzene were studied. Ethylene loadings were measured as described above, complex viscosities were determined with a calibrated capillary viscosimeter. The results obtained are summarized in Table 1.

TABLE 1

| Starting complex | Solvent boiling point, ° C. | Solvent molecular weight per copper | $C_2H_4$ loading (mols $C_2H_4$/mol Cu) at 50° C./1 atm. | Complex viscosity, centistokes at 75° C. |
|---|---|---|---|---|
| 2.1 mols of benzene plus 1 mol $CuAlCl_4$ | 80 | 156 | 1.50 | 2.1 |
| 1.06 mols diphenyl methane plus 1 mol $CuAlCl_4$ | 265 | 168 | 1.50 | 18 |
| 2.1 mols cyclohexyl benzene plus 1 mol $CuAlCl_4$ | 237 | 320 | 1.50 | 2.2 |

The bottoms from the complexer-stripper tower which is highly loaded in ethylene (typically 1.5–1.9 mols of ethylene/mol of copper) is pumped up in pressure to 15–40 atmospheres and sent through a heat exchanger into the first of a series of decomplexing flashes. In the first flash, typically at 250–300° F., a large fraction of the ethylene is flashed off into the product line. The complex then flows to a second flash at the same temperature and pressure lower than in the first flash but higher than in the complexer stripper tower to provide product and some stripping gas for recycle to the complexer stripper. Finally, lower pressure flashes liberate additional ethylene which must be compressed to product pressure. The lean complex from the final flash is recycled back to the top of the complexing tower after being cooled in heat exchange with the ethylene-rich complex. Complex treatment facilities to remove any undesirable side reaction products or impurities may be provided for the order of 1–10% of the complex stream. Any small amount of residual solvent present in the product ethylene is removed by condensation and adsorption or distillation.

The present invention may be illustrated but is not necessarily limited to the following examples.

These data show that on going from benzene to diphenyl methane the solvent volatility is reduced markedly without detriment to the molecular weight to copper ratio or other ethylene complexing capability. Going from benzene to cyclohexyl benzene (a single ring high boiling aromatic) introduces the debit of a higher molecular weight to copper ratio, although viscosity is not increased.

Example 2

The experiment described in Example 1 was repeated with three other aromatic solvents for the $CuAlCl_4$ complex—methyl biphenyl, triisopropyl benzene, and a mixed solvent of methyl biphenyl and triisopropyl benzene. These results are summarized in Table 2.

TABLE 2

| Starting complex | Solvent boiling point, ° C. | Solvent molecular weight per copper | $C_2H_4$ loading (mols $C_2H_4$/mol Cu) at 50° C./1 atm. | Complex viscosity, centistokes at 75° C. |
|---|---|---|---|---|
| 1.0 mol methyl biphenyl plus 1 mol $CuAlCl_4$ | 273 | 168 | 1.50 | 31 |
| 1.24 mols methyl biphenyl plus 1 mol $CuAlCl_4$ | 273 | 168 | 1.50 | 24 |
| 2.0 mols triisopropyl benzene plus 1 mol $CuAlCl_4$ | 260 | 408 | 1.50 | 2.1 |
| 1.0 mol methyl biphenyl plus 0.25 mol triisopropyl benzene plus 1 mol $CuAlCl_4$ | | 219 | 1.50 | 18 |
| 1.0 mol methyl biphenyl plus 0.5 mol triisopropyl benzene plus 1 mol $CuAlCl_4$ | | 270 | 1.50 | 11 |

These data show that a small addition of single ringed aromatic, e.g. triisopropyl benzene to a multi-ringed aromatic, e.g. methyl biphenyl, reduces viscosity by an unexpectedly large amount and to a much greater extent than is achieved by corresponding dilution with the multiring aromatic component.

EXAMPLE 3

The experiment described in Example 1 was repeated again with biphenyl and O-chloro biphenyl complexes of $CuAlCl_4$, with the results shown in Table 3.

TABLE 3

| Starting complex | Solvent boiling point, °C. | Solvent molecular weight per copper | C₂H₄ loading (mols C₂H₄/mol Cu) at 50° C./1 atm. | Complex viscosity, centistokes at 75° C. |
|---|---|---|---|---|
| 1.0 mol biphenyl plus 1.0 mol CuAlCl₄ | 260 | 154 | | Solid |
| 1.0 mol biphenyl plus 0.2 mol O-chlorobiphenyl plus 1.0 mol CuAlCl₄ | | 192 | 1.50 | 15-20 |
| 2.0 mols O-chlorophenyl plus 1.0 mol CuAlCl₄ | 274 | 189 | 1.54 | 10 |

These data show that a relatively small addition of a single ring aromatic component (O-chloro-biphenyl has only one complexable aromatic ring) produces a mobile liquid complex even with a major component such as biphenyl which alone forms a non-liquid complex.

What is claimed is:

1. A process for separating a complexible ligand selected from the group consisting of $C_2$–$C_6$ acetylenes, $C_2$–$C_{20}$ monoolefins, $C_4$–$C_{10}$ conjugated diolefins, $C_6$–$C_9$ aromatics and carbon monoxide, from a feedstream containing the ligand which comprises contacting the feedstream with a sorbent comprising cuprous (I) salts selected from the group consisting of $CuAlCl_4$, $CuBF_4$, $CuCOOCF_3$, $CuPF_6$, $CuBCl_4$, $CuAlBr_4$, $CuAlCl_xB_{r_y}$ and $Cu\phi_xAlCl_y$ wherein $\phi$ is phenyl, and $x+y$ is 4, said sorbent dissolved in a complexing solvent comprising in a major amount high boiling, low melting, multi-ringed aromatics selected from the group consisting of biphenyl, alkyl substituted biphenyl, polyphenyl alkanes, substituted polyphenyl alkanes, naphthalene and alkyl substituted naphthalenes, and in a minor amount strongly complexing, high boiling, single-ringed aromatics, the contacting is conducted under reaction conditions to form a complex of the ligand and the sorbent to thereby remove said ligand from the feedstream.

2. The process of claim 1 wherein said sorbent is cuprous tetrachloroaluminate.

3. The process of claim 1 wherein said single-ringed aromatic is an alkyl substituted benzene whose alkyl substituent has from 2 to 30 carbon atoms.

4. A process for separating a complexible ligand selected from the group consisting of $C_2$–$C_4$ acetylenes, $C_2$–$C_{10}$ monoolefins, $C_3$–$C_6$ conjugated diolefins, $C_6$–$C_{12}$ polyolefins, $C_6$–$C_9$ aromatics and carbon monoxide, from a feedstream containing the ligand which comprises contacting the feedstream with a sorbent comprising cuprous tetrachloroaluminate, said sorbent dissolved in a complexing solvent comprising a major amount of a multi-ringed, high boiling, low melting aromatic selected from the group consisting of biphenyl, alkyl substituted bipheny, naphthalene and alkyl substituted naphthalenes, said solvent additionally containing a minor amount of a strongly complexing, high boiling, single-ringed aromatic, the contacting is conducted under reaction conditions to form a complex of the ligand and the sorbent to thereby remove the ligand from said feedstream.

5. The process of claim 4 wherein the desired complexible ligand to be separated is ethylene or propylene.

6. The process of claim 4 wherein the complexing solvent has a viscosity in the range of from 0.5 to 12 centistokes at 50° C.

7. The process of claim 4 wherein the complexing solution comprises in a major amount methyl biphenyl or isopropyl biphenyl and triisopropyl benzene in a minor amount.

References Cited
UNITED STATES PATENTS

| 3,651,159 | 3/1972 | Long et al. | 260—681.5 X |
| 3,592,865 | 7/1971 | Long et al. | 260—681.5 X |
| 3,517,081 | 6/1970 | Beckham et al. | 260—677 |
| 3,218,366 | 11/1965 | Baxter | 260—677 A |
| 3,410,924 | 11/1968 | Fasce | 260—677 |

DELBERT E. GANTZ, Primary Examiner

J. M. NELSON, Assistant Examiner

U.S. Cl. X.R.

260—681.5 C